United States Patent
Wischinski

(12) 
(10) Patent No.: US 6,587,900 B1
(45) Date of Patent: Jul. 1, 2003

(54) SYSTEM FOR COMMUNICATING DIAGNOSTIC DATA IN AN INDUSTRIAL CONTROL SYSTEM

(75) Inventor: Rainer H. Wischinski, Sandown, NH (US)

(73) Assignee: Schneider Automation, Inc., North Andover, MA (US)

( * ) Notice: Subject to any disclaimer, the term of this patent is extended or adjusted under 35 U.S.C. 154(b) by 0 days.

(21) Appl. No.: 09/577,099

(22) Filed: May 24, 2000

(51) Int. Cl.[7] ................................................. G06F 7/32
(52) U.S. Cl. ........................... 710/68; 710/30; 370/466; 370/474
(58) Field of Search ..................... 710/68, 30; 370/466, 370/474

(56) References Cited

U.S. PATENT DOCUMENTS

| | | | | |
|---|---|---|---|---|
| 6,061,603 A | * | 5/2000 | Papadopoulos et al. | 700/67 |
| 6,134,245 A | * | 10/2000 | Scarmalis | 370/474 |
| 6,393,033 B1 | * | 5/2002 | Woodward et al. | 370/466 |

* cited by examiner

Primary Examiner—Kim Huynh
Assistant Examiner—Tammara Peyton

(74) Attorney, Agent, or Firm—Michael J. Femal; Larry I. Golden

(57) ABSTRACT

A system and corresponding method for communicating non-I/O data between components of an industrial control system (ICS) including control or automation devices and a programmable logic controller. The method includes the steps of: having one of the components, such as a control or automation device, transmit the non-I/O data formatted as a message frame in the same way as a I/O data is formatted as a message frame, including having a message type identifier to identify that the message frame bears non-I/O data; and having another of the components, such as the programmable logic controller, receive the encapsulated non-I/O data as a message frame, wherein the receiving component identifies the non-I/O data based on the message type identifier conveyed with the message frame and extracts the non-I/O data from the message frame. The transmitting component transmits the non-I/O data over a field bus such as a PROFIBUS, INTERBUS, DEVICENET, CAN, or CAN OPEN types of field bus. The message type identifier can also indicate either the sender or both the sender and the intended recipient. The components of the ICS that communicate non I/O data each include a translator module to encapsulate and de-encapsulate the non-I/O data from (virtual I/O) message frames, based on the message identifier pre-determined to correspond to the non-I/O message data.

10 Claims, 2 Drawing Sheets

SYSTEM FOR COMMUNICATING DIAGNOSTIC DATA IN AN INDUSTRIAL CONTROL SYSTEM

BACKGROUND OF THE INVENTION

1. Technical Field

The present invention pertains to the field of industrial control automation. More particularly, the present invention pertains to the communication in an industrial control environment of diagnostics and other non-input/output device data.

2. Description of Related Art

An industrial control system (ICS) typically uses field buses, such as Interbus or Profibus, as the backbone of a proprietary network. These standard buses communicate input and output information of ICS automation or control devices, and are able to do so in a multi-vendor environment. Standard buses however do not allow for an easy way to communicate other kinds of data, such as diagnostic information. Since automation and control devices now in use by a typical ICS are intelligent today, in that they perform more complex functions, it is advantageous to receive other kinds of data from the devices, besides pure ICS device input and output.

What is needed is a way to communicate data that is other than ICS device input or output data, and, ideally, a way that does not depend on the particular bus being used.

SUMMARY OF THE INVENTION

Accordingly, the present invention provides, a system and corresponding method for communicating non-I/O data between components of an industrial control system (ICS), the ICS components including control or automation devices and a programmable logic controller. The method includes the steps of: having one of the components, such as a control or automation device, transmit the non-I/O data formatted as a message frame in the same way as a I/O data is formatted as a message frame, including having a message type identifier to identify that the message frame bears non-I/O data; and having another of the components, such as the programmable logic controller, receive the encapsulated non-I/O data as a message frame, wherein the other of the components (the receiving component) identifies the non-I/O data based on the message type identifier conveyed with the message frame and also extracts the non-I/O data from the message frame.

In a further aspect of the invention, the transmitting component transmits the non-I/O data over a field bus such as one implemented according to PROFIBUS, an international, vendor-independent, open field bus standard (under the European field bus standard EN 50 170) and in particular, such a field bus as provided by Siemens; or a field bus implemented according to the standard INTERBUS, such as provided by Phoenix Contact; or a field bus implemented according to the standard DEVICENET, such as provided by Allen Bradley; or a field bus according to the controller area networks (CAN) standard, the standard maintained by the CAN in Automation (CiA) international users and manufacturers group; or a field bus implementing CANOPEN, a higher-layer protocol, also maintained by CiA, that provides device profiles specifying standardized application behavior.

The components that communicate non I/O data each include a translator module to encapsulate and de-encapsulate the non-I/O data from (virtual I/O) message frames, based on the message identifier pre-determined to correspond to the non-I/O message data. For example, the control or automation device includes a device translator, and the programmable logic controller includes a controller translator.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
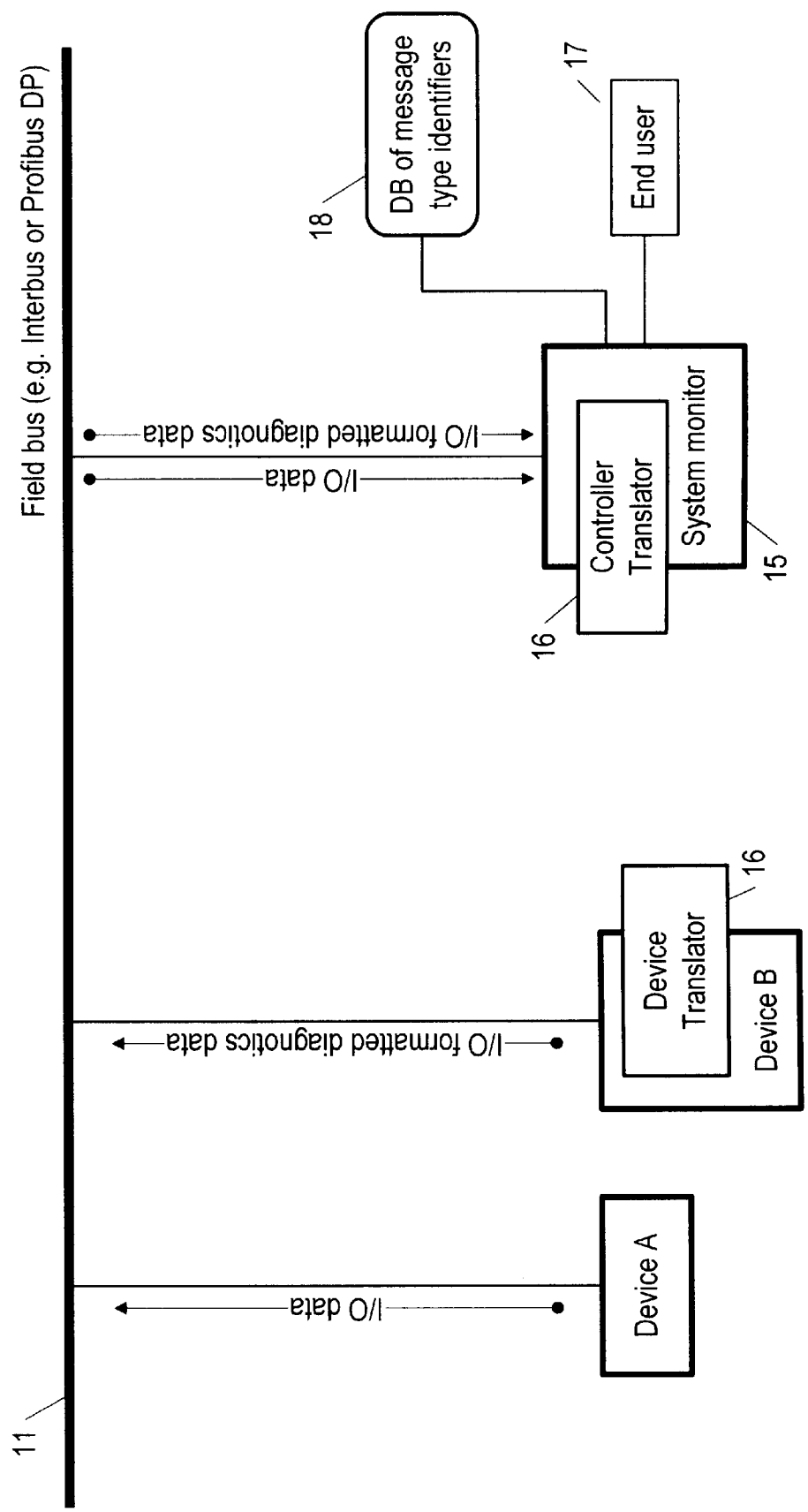
FIG. 1 is a block diagram showing a system, according to the present invention, that communicates both input and output device data as well as other device data.

Referring now to FIG. 1, an industrial control system (ICS) is shown as including components for using the method of the present invention to communicate over a field bus 11 both ICS device input or output (I/O) data, such as the I/O data from a control or automation device A, and also non-I/O data from a control or automation device B to a programmable logic controller (PLC) 15. The PLC 15 functions as a host device or host controller and is indicated in FIG. 1 as a system monitor. The field bus 11 is typically either an INTERBUS type of field bus, a CAN type of field bus, a CAN OPEN type of field bus, a PROFIBUS DP type of field bus, or a DEVICENET type of field bus. The control or automation devices (device A and device B) are for example I/O devices, variable frequency drives, and so on.

The I/O data are process input and output data, i.e. the control or automation data required to control or automate a process. Non I/O data are for example diagnostic information such as would be useful in troubleshooting or in scheduling preventive maintenance, but non I/O data can in general be any data that is not I/O data required for process control per se.

According to the invention, to communicate the non-I/O device data, virtual I/O on the field bus 11 is implemented. More specifically, the non-I/O data is encapsulated, or formatted, in a data object so as to appear to the field bus to be I/O data. The non-I/O data is then communicated between the PLC 15 and the device B just as if it were I/O data. This approach allows communicating non-I/O data in the same way as I/O data, and independent of the particular protocol being used by the field bus. Thus, the present invention allows a PLC 15 functioning as a host controller to send and receive non-I/O data with device B of the ICS in the same way as the PLC 15 would send and receive I/O data. An end user 17 may connect via a personal computer through a network to the PLC 15.

To send non-I/O data between device B and the PLC 15 as if it were I/O data, the present invention uses a device translator 16 in device B and a controller translator 16 in the PLC 15. Each translator performs both the encapsulating of non-I/O data into an I/O message frame, and also the extracting of non-I/O data from the I/O message frame. The I/O message frame includes a pre-determined message type identifier. The different types of message are stored in a database (DB) 18 of message type identifiers. The present invention then implements virtual I/O on the field bus interface of Device B by sending the information needed to configure device B encapsulated in an I/O message frame. Device B knows the I/O message frame is a virtual I/O message frame (from the message type) and translates it accordingly.

The ICS devices, in the preferred embodiment, do not access the DB 18 of message type identifiers because each is programmed to provide only one or more message types. If the types of message a device sends or receives ever changes, the device is re-programmed.

Two message addressing schemes are used. In a first message addressing scheme, called the source-destination message addressing scheme, the message type identifier indicates the message content (what the data concerns), the source of the message, and also the intended recipient. Thus, in case of device B sending to the PLC 15 non I/O data that is diagnostics information, the message type identifier would indicate that the message frame bears data that is diagnostic information from device B and is intended for the PLC 15. In case of the PLC 15 sending to device B non I/O data that is a command to enter a particular safe state, the message identifier would indicate that the message frame bears data that is a command from the PLC and is intended for device B. In case of non I/O data that is of a size requiring that it be encapsulated in more than one message frame (because of the field bus protocol), the message type identifier would indicate not only the type of data, the sender and the recipient, but also the order of the non I/O data in the series of message frames used to communicate the entire body of non I/O data.

In a second, preferred message addressing scheme, called the producer-consumer message addressing scheme, the message type identifier indicates only the message content (what the data concerns) and source of the message (the producer), but does not indicate the destination (consumer). In this scheme, a message is essentially made available to any of the components of the network that are programmed to read the message.

Figure 2:
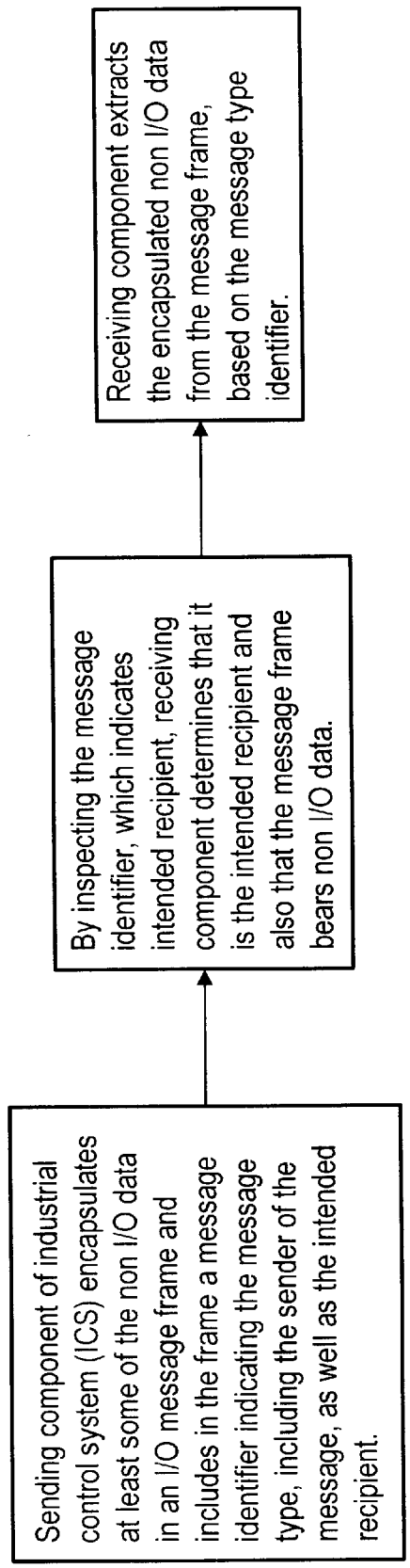
FIG. 2 is a flowchart showing the method of the present invention.

Referring now to FIG. 2, a flowchart of the method of the present invention is shown, indicating that the method allows for two-way communication between the PLC and a control or automation device of an ICS, i.e. any component of an ICS can be either the sender or the receiver of a virtual I/O message frame according to the invention. Thus, for example, not only can control or automation devices send non-I/O data to a PLC, and conversely, but control or automation devices can also communicate non-I/O data among themselves.

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A method for communicating non-I/O data between components of an industrial control system (ICS), the ICS having components including control or automation devices and a programmable logic controller, the method comprising the steps of:
    a) having one of the components transmit the non-I/O data formatted as a message frame in the same way as I/O data is formatted as a message frame, including having a message type identifier to identify that the message frame bears non-I/O data; and
    b) having another of the components, one for which the non-I/O data is intended, receive the encapsulated non-I/O data as a message frame, wherein the receiving component identifies the non-I/O data based on the message type identifier conveyed with the message frame, and further wherein the receiving component extracts the non-I/O data from the message frame.

2. A method as in claim 1, wherein the transmitting component transmits the non-I/O data over a field bus selected from the group consisting of PROFIBUS, INTERBUS, DEVICENET, CAN, and CAN OPEN.

3. A method as in claim 1, wherein the message type identifier also identifies the sending component.

4. A method as in claim 1, wherein the message type identifier also identifies both the sending component and the intended receiving component.

5. A system for communicating non-I/O data between components of an industrial control system (ICS), the components including control or automation devices and a programmable logic controller, the system comprising:
    a) a first translator included in a first one of the components, for providing as a virtual I/O message frame at least some of the non-I/O data, encapsulated in an I/O message frame and bearing a message type identifier pre-determined to correspond to the encapsulated non-I/O data;
    b) a second translator included in a second one of the components, responsive to the virtual I/O message frame, for extracting the encapsulated non-I/O data from the virtual I/O message frame based on the message type identifier pre-determined to correspond to the non-I/O data.

6. The system as in claim 5, wherein the virtual I/O message frame is provided from the first translator to the second translator via a field bus selected from the group consisting of PROFIBUS, INTERBUS, DEVICENET, CAN, and CAN OPEN.

7. The system as in claim 5, wherein the message type identifier also identifies the first component.

8. The system as in claim 5, wherein the message type identifier also identifies both the first component and the second component.

9. A method for use by components of an industrial control system (ICS) in communicating non-I/O data provided by the components of the ICS, the ICS having components including control or automation devices and a programmable logic controller, the components communicating with each other via a field bus, the method comprising the steps of:
    a) transmitting over the field bus the non-I/O data and a message type identifier formatted as a formatted I/O data signal, the message type identifier for distinguishing the formatted non-I/O data signal from a formatted I/O data signal; and
    b) receiving over the field bus the formatted non-I/O data signal and determining that the formatted non-I/O data signal includes non-I/O data by use of the message type identifier.

10. An industrial control system (ICS), comprising components at least two of which each include means for performing the steps of claim 9.

* * * * *